US010041693B2

(12) United States Patent
Rheaume

(10) Patent No.: US 10,041,693 B2
(45) Date of Patent: Aug. 7, 2018

(54) SOLAR-POWERED RIDGE VENT FAN UNIT

(76) Inventor: Daniel Joseph Rheaume, Seattle, WA (US)

(*) Notice: Subject to any disclaimer, the term of this patent is extended or adjusted under 35 U.S.C. 154(b) by 680 days.

(21) Appl. No.: 13/429,040

(22) Filed: Mar. 23, 2012

(65) Prior Publication Data

US 2012/0252348 A1 Oct. 4, 2012

Related U.S. Application Data

(60) Provisional application No. 61/469,214, filed on Mar. 30, 2011.

(51) Int. Cl.
*F24F 7/02* (2006.01)
*F24J 2/52* (2006.01)
*H02S 20/23* (2014.01)
*F24F 5/00* (2006.01)

(52) U.S. Cl.
CPC ............ *F24F 7/025* (2013.01); *F24J 2/5228* (2013.01); *H02S 20/23* (2014.12); *F24F 2005/0064* (2013.01); *Y02A 30/272* (2018.01); *Y02B 10/12* (2013.01); *Y02B 10/24* (2013.01); *Y02E 10/47* (2013.01); *Y10T 29/49355* (2015.01); *Y10T 29/49623* (2015.01)

(58) Field of Classification Search
CPC ........ Y02E 10/50; Y02B 10/12; F24F 5/0064; F24F 5/0067; F24F 7/025
USPC ......... 454/343, 900, 365; 126/623; 248/237; 52/173.3
See application file for complete search history.

(56) References Cited

U.S. PATENT DOCUMENTS

| | | | | |
|---|---|---|---|---|
| 4,939,986 A | * | 7/1990 | Turner | .......................... 454/347 |
| 5,165,642 A | * | 11/1992 | Rihaly | .................... E04D 15/02 |
| | | | | 182/45 |
| 5,505,788 A | * | 4/1996 | Dinwoodie | ................ F24J 2/34 |
| | | | | 136/244 |
| 6,159,093 A | * | 12/2000 | Mihalko, III | ........... F24F 7/025 |
| | | | | 454/341 |
| 6,584,737 B1 | * | 7/2003 | Bradley, Jr. | ............. F24J 2/5247 |
| | | | | 248/148 |
| 7,155,870 B2 | * | 1/2007 | Almy | ........................ E04D 1/34 |
| | | | | 248/222.12 |
| 7,762,027 B1 | * | 7/2010 | Wentworth et al. | ......... 52/173.3 |

(Continued)

FOREIGN PATENT DOCUMENTS

DE 102006028494 A1 * 1/2008 ............. F24J 2/4612
EP 2522928 A1 * 11/2012 ........... E04H 1/1272

(Continued)

OTHER PUBLICATIONS

Sagayama Kenichi. JP 2010 141266A; Installing stand of solar cell module, method of constructing the same, and solar photovoltaic power generation system, Jun. 24, 2010. Machine translation completed via Espacenet: European Patent Office, http://worldwide.espacenet.com.*

*Primary Examiner* — Alissa Tompkins
*Assistant Examiner* — Frances F Hamilton
(74) *Attorney, Agent, or Firm* — Seed IP Law Group LLP

(57) ABSTRACT

A solar powered fan kit is provided for installation in a roof and in the ridge of the roof. The solar powered fan kit includes a fan attached to a fan bracket. The fan bracket is configured to be suspended from a roof within a ridge vent of the roof. A solar panel is attached to the roof to supply power to the fan.

16 Claims, 3 Drawing Sheets

(56) References Cited

U.S. PATENT DOCUMENTS

| | | | |
|---|---|---|---|
| 7,814,899 B1 * | 10/2010 | Port | F24J 2/5211 126/571 |
| 8,141,306 B2 * | 3/2012 | Masuda | F24J 2/465 126/621 |
| 8,176,693 B2 * | 5/2012 | Abbott | F16B 2/185 52/173.1 |
| D663,608 S * | 7/2012 | Ruperto | D8/354 |
| 8,221,200 B2 * | 7/2012 | Oaten | E04D 13/174 454/185 |
| 8,234,824 B2 * | 8/2012 | Botkin | F24J 2/5211 126/623 |
| 8,266,846 B2 * | 9/2012 | Schoell | F24J 2/045 126/621 |
| 8,272,176 B2 * | 9/2012 | Wallgren | F24J 2/5233 126/623 |
| 8,316,592 B2 * | 11/2012 | Lanza | E04D 1/30 248/237 |
| 8,558,101 B2 * | 10/2013 | Mascolo | F24J 2/4636 136/243 |
| 8,608,533 B2 * | 12/2013 | Daniels | F24F 7/025 454/250 |
| 8,820,030 B2 * | 9/2014 | Sager | 248/237 |
| 8,844,887 B2 * | 9/2014 | Genschorek | B30B 3/04 182/117 |
| D718,101 S * | 11/2014 | Mason | D8/14 |
| 9,109,814 B2 * | 8/2015 | Patton | F24J 2/4607 |
| 9,291,369 B2 * | 3/2016 | West | F24J 2/5211 |
| 2005/0191957 A1 * | 9/2005 | Demetry | F24F 7/025 454/341 |
| 2008/0053008 A1 * | 3/2008 | Ohkoshi | F24J 2/5205 52/173.1 |
| 2008/0053009 A1 * | 3/2008 | Plaisted | F24J 2/4614 52/173.3 |
| 2008/0113612 A1 * | 5/2008 | Chich et al. | 454/341 |
| 2008/0264470 A1 * | 10/2008 | Masuda | F24J 2/465 136/251 |
| 2008/0302407 A1 * | 12/2008 | Kobayashi | F24J 2/5211 136/251 |
| 2009/0293864 A1 * | 12/2009 | Augenbraun | H01L 31/02008 126/623 |
| 2010/0065108 A1 * | 3/2010 | West | F24J 2/5211 136/251 |
| 2010/0078492 A1 * | 4/2010 | Cislo | F24F 7/06 236/49.3 |
| 2010/0083588 A1 * | 4/2010 | Hockman | E04D 13/10 52/24 |
| 2010/0313928 A1 * | 12/2010 | Rose | F24J 2/045 136/244 |
| 2011/0124280 A1 * | 5/2011 | Railkar | E04D 13/174 454/341 |
| 2011/0210085 A1 * | 9/2011 | Plaisted | F24J 2/045 211/41.1 |
| 2011/0277400 A1 * | 11/2011 | Kosslinger | F24J 2/5235 52/173.1 |
| 2011/0314751 A1 * | 12/2011 | Jette | 52/173.3 |
| 2012/0045983 A1 * | 2/2012 | Eskola, III | F24F 7/025 454/341 |
| 2012/0178357 A1 * | 7/2012 | Rheaume | 454/343 |
| 2012/0302154 A1 * | 11/2012 | Bushey | 454/343 |

FOREIGN PATENT DOCUMENTS

| | | | | |
|---|---|---|---|---|
| GB | 2279453 A | * | 1/1995 | F24F 7/007 |
| JP | 2010141266 A | * | 6/2010 | F24J 2/5233 |
| WO | WO 2010130461 A1 | * | 11/2010 | F24J 2/5235 |

* cited by examiner

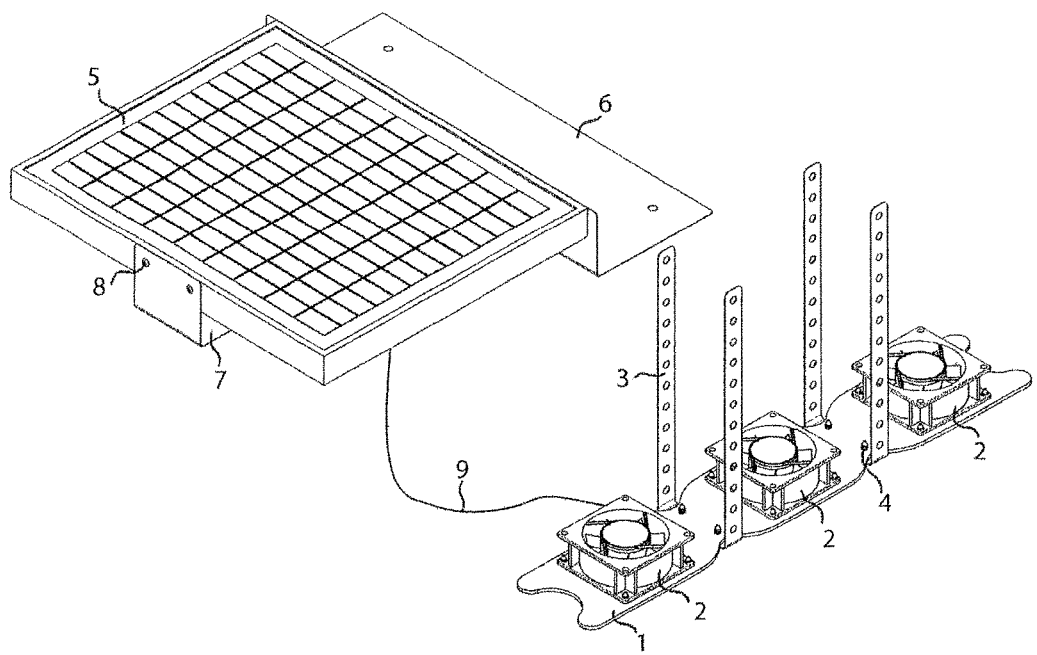
FIG. 1
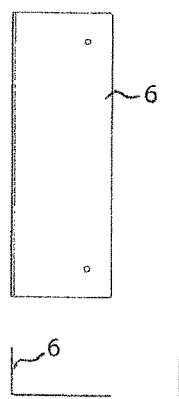 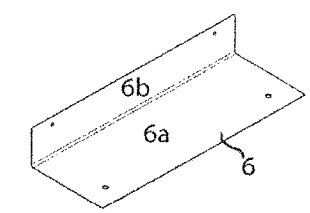 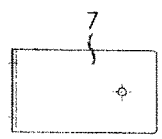 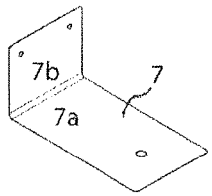
 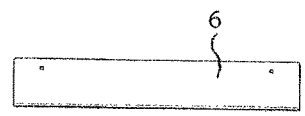 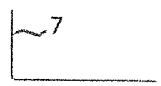
FIG. 2  FIG. 3

SOLAR-POWERED RIDGE VENT FAN UNIT

CROSS-REFERENCE TO RELATED APPLICATION

This application claims the benefit under 35 U.S.C. § 119(e) of U.S. Provisional Patent Application No. 61/469,214 filed Mar. 30, 2011.

BACKGROUND

Technical Field

The present disclosure relates to a fan for a ridge vent. The present disclosure relates more particularly to a solar powered fan for a ridge vent.

Description of the Related Art

The upper floors of buildings and homes are typically much hotter than the lower floors because heat tends to rise and make the air hotter near the top than near the bottom. In particular, the air that is at the very top of a structure, such as in the attic or on the top floor of a building, can become very hot because the air cannot rise through the roof of the structure, and therefore very hot air gets trapped at the top of the structure. With the hot air trapped at the top of the structure, costs for cooling the building can be very high.

To alleviate this problem, ridge vents are installed in many roofs in order to allow hot air trapped near the top of the building to vent to the outside, thereby cooling the building. However, the flow of hot air from the top of the building through the ridge vent can be very small and often depends on the amount of wind blowing across the roof of the structure. On particularly hot days where there is no breeze there can be very little air flow through the vent and therefore the air within the attic or top floor of the structure can become extremely hot and greatly increase the temperature in the structure including on the floors below. The cost of cooling the structure likewise increases. In addition to this, moist air in an attic of a home can cause damage to the home and may result in the need for a roof to be replaced. Surface mounted solar powered fan systems have been proposed with a solar panel set in caulking which can leak.

BRIEF SUMMARY

One embodiment is a solar powered roof vent fan kit comprising a fan, a fan bracket coupled to the fan and configured to fit within a ridge vent of a roof, a solar panel configured to be fixed to the roof adjacent the ridge vent and spaced above the roof, and a wire configured to couple between the fan and the solar panel to supply the fan with electrical power from the solar panel when the fan is installed in the ridge vent and the solar panel is fixed to the roof.

In one embodiment the solar powered roof vent fan kit comprises a top flashing configured to be fixed to the solar panel and having a lower surface configured to be mounted on the roof extending upward toward the ridge vent away from the solar panel.

In one embodiment the lower surface of the top flashing is configured to be concealed below a shingle of the roof.

In one embodiment the solar powered roof vent fan kit comprises a lower mount bracket configured to be fixed to the solar panel and having a lower surface configured to be mounted on the roof directly below the solar panel.

In one embodiment the lower surface of the top flashing is configured to be concealed below a shingle of the roof.

One embodiment is a method comprising positioning a fan within a ridge vent in a roof, fixing a first bracket to the roof adjacent the ridge vent, fixing a solar panel to the first bracket, the first bracket configured to hold the solar panel above the roof and spaced apart from the roof, and electrically coupling the solar panel to the fan to power the fan.

In one embodiment positioning the fan in the ridge vent includes suspending the fan from the roof within the ridge vent by a strap coupled to the roof.

In one embodiment the strap is flexible.

In one embodiment the method comprises concealing the first bracket beneath shingles of the roof.

In one embodiment the first bracket extends away from the solar panel toward the ridge vent.

In one embodiment the method includes fixing a second bracket to the roof, and fixing the second bracket to the solar panel to hold the solar panel above the roof and spaced apart from the roof.

In one embodiment the method comprises positioning the second bracket below the solar pane.

In one embodiment the method comprises position the second bracket below a shingle of the roof.

One embodiment is a ridge vent fan kit comprising including a fan bracket, a fan mounted to the fan bracket, and a strap configured to suspend the fan bracket in a ridge vent of a roof.

In one embodiment the ridge vent fan kit comprises a plurality of fans mounted to the fan bracket.

In one embodiment the ridge vent fan kit comprises a solar panel configured to be fixed to the roof adjacent the ridge vent and to supply power to the fan.

In one embodiment the ridge vent fan kit comprises a solar panel mounting bracket configured to fix the solar panel to roof with a space between the roof and the solar panel.

BRIEF DESCRIPTION OF THE SEVERAL VIEWS OF THE DRAWINGS

FIG. 1 is an elevated perspective view of components of a solar powered ridge vent kit according to one embodiment.

FIG. 2 illustrates several views of a top solar panel mount flashing according to one embodiment.

FIG. 3 illustrates several views of a lower solar panel mount bracket according to one embodiment.

DETAILED DESCRIPTION

Figure 4:
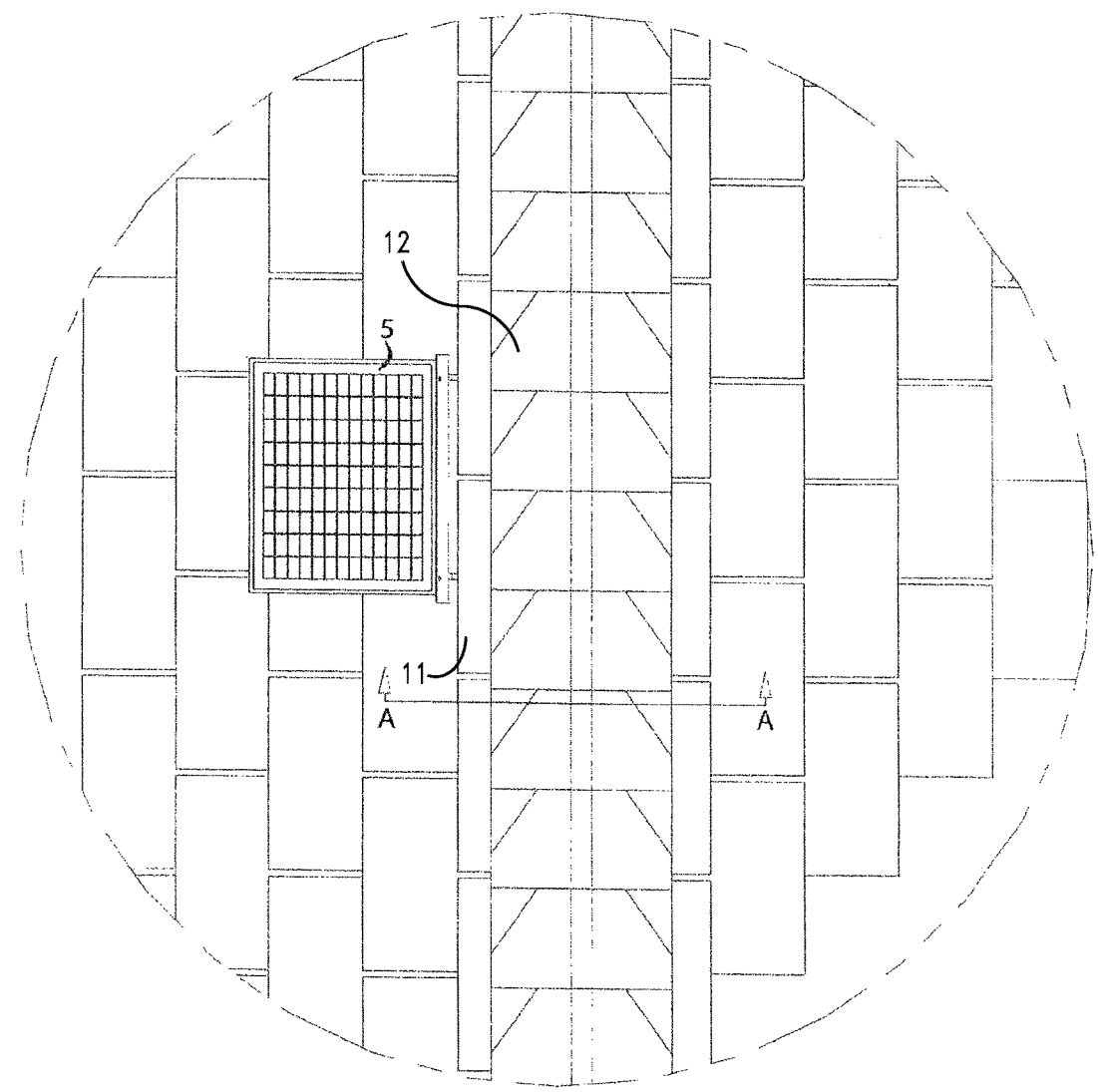
FIG. 4 is a top view of a solar panel mounted near a ridge of a roof according to one embodiment.

In the following description, numerous specific details are given to provide a thorough understanding of embodiments. The embodiments can be practiced without one or more of the specific details, or with other methods, components, materials, etc. In other instances, well-known structures, materials, or operations, such as, for example, vents, fans, solar panels, etc., are not shown or described in detail to avoid obscuring aspects of the embodiments. For example, a solar panel or a fan may comprise electronic components, such as diodes, connectors, switches, controllers, etc., which are not illustrated or described in detail.

Reference throughout this specification to "one embodiment" or "an embodiment" means that a particular feature, structure, or characteristic described in connection with the embodiment is included in at least one embodiment. Thus, the appearances of the phrases "in one embodiment", "according to an embodiment", or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

FIG. 1 illustrates components of a solar powered ridge vent fan kit according to one embodiment. The kit includes a fan bracket 1 to which has been mounted multiple fans 2. The fan bracket 1 holds the fans 2 rigidly in place. The fans 2 can be mounted to the fan bracket 1 by screws, clips or any other suitable method for mounting a fan to a fan bracket. The kit further includes roof mount straps 3 which are mounted to the bracket 1 by clips 4 (e.g. Christmas tree clips). The mounting straps 3 allow the bracket 1 and fans 2 to be mounted in a ridge vent by suspending the bracket and fans from the roof just below the ridge of the roof within an attic or other interior space. The kit further includes a solar panel 5 which is configured to be mounted to the roof of a house or other structure in which the bracket 1 and fans 2 are installed. A top solar panel mount flashing 6 is configured to be attached to the solar panel 5. The top solar panel mount flashing 6 is further configured to be fixed to the roof of a structure thereby fixing the solar panel 5 to the roof of the structure while keeping the solar panel 5 elevated from a surface of the roof of the house. The kit further includes a lower solar panel mount bracket 7 configured to be attached to the solar panel 5 by screws 8. The lower solar panel mount bracket 7 is also configured to be fixed to the roof beneath a shingle or other suitable roof covering to further fix the solar panel 5 to the roof. A wire harness 9 electrically couples the solar panel 5 to the fans 2. The wire harness 9 conducts electricity from the solar panel 5 to power the fans 2.

The solar powered ridge vent fan kit of FIG. 1 is configured to be installed on a roof and in a ridge vent of a house or other building or structure. In particular, the solar panel 5 with flashing 6 and bracket 7 are configured to be mounted on an outer surface of the roof. The flashing 6 and the bracket 7 fix the solar panel 5 to the roof while providing a gap between the solar panel 5 and the roof. The fans 2 are installed in a ridge vent which may have been installed previously in the roof. In a typical ridge vent installed on a roof of a structure, a vent near the ridge of the roof provides an opening between a ridge cover and the roof, which extends the length of the ridge and leaves a gap of, for example, 2 inches between the ridge cover and the roof on either side of the ridge for the length of the ridge. The ridge cover prevents debris from getting in the gap and entering into the attic or other portion of the structure on which the roof is installed. The ridge vent thus provides a conduit between the exterior of the structure and an upper part of the interior of the structure where hot air can accumulate. The ridge vent is thus positioned so that there is a space between the ridge of the roof and the ridge cover so that air may flow from the interior of the structure through the vent and out to the exterior of the structure. The fans 2 remain suspended in the ridge vent below the ridge cover by the roof mount straps 3 as described previously. The solar panel 5 collects energy from sunlight incident on top of the solar panel 5 and converts it to electricity which is passed to the fans 2 by the wire harness 9. The fans 2 may thus be powered entirely or partially by electricity generated from the sun. When power is applied to the fans, the fans spin and cause air from within the structure to be expelled to the exterior of the structure thereby cooling the structure and removing moisture therefrom.

In one embodiment, the solar panel 5 has a rectangular shape and is about 14 inches by 12 inches by about 1¼ inch thick. Other dimensions may be used. For example the solar panel may be 1³⁄₁₆ inches thick. The solar panel 5 is for example a 10 Watt solar panel. Three fans are mounted to fan bracket 1. The fan bracket 1 is for example about 20 inches long by 3½ inches wide. Other dimensions may be used. For example the fan bracket 1 may be about 20 inches by 3⅝ inches. The individual fans 2 are for example about 3 inches by 3 inches by 1 inch thick. Other dimensions may be used. For example the individual fans may be about 3⅛ inches by 3⅛ inches by 1 inch thick. The top solar panel mount flashing 6 is for example about 15½ inches wide, which is wider than the solar panel 5. This helps to prevent debris from gathering under the solar panel 5. The horizontal portion of the top solar panel mount flashing is about 5.7 inches deep, facilitating installation underneath the uphill shingle for maintenance-free flashing, and is attached to the roof deck with two screws 10. The vertical portion of the lower solar panel mount bracket 7b also raises the solar panel off the roof deck to allow for airflow and dispersing of heat under the solar panel 5. The horizontal portion of the lower solar panel mount bracket 7a is about 5.6 inches deep, facilitating installation underneath the uphill shingle for maintenance-free flashing, and is attached to the roof truss system with a screw, making it the most secure point of the solar panel installation to withstand high winds. One embodiment therefore includes a hidden flashing system requiring little or no maintenance.

Additionally, some components of the kit can be replaced with conventional components from other fan systems. For example, the fans 2 can be replaced by conventional fans. Other modifications can be made without departing from the scope of the present disclosure.

FIG. 2 illustrates several views of the top solar panel mount flashing 6. The upper right view is an elevated view by which both flat surfaces 6a and 6b of the solar panel mount flashing 6 are apparent. The surface 6a is the surface which will be mounted directly to the roof of the structure to which the solar panel 5 will be attached, and the surface 6b is the surface which will be attached directly to the solar panel 5. In the upper left view, the top solar panel mount flashing 6 is oriented vertically with the surface 6a facing out of the page. Holes are evident by which the top solar panel mount flashing 6 may be fixed to the roof on which the solar panel will be attached. In the lower left view, both of the surface 6a, 6b of the top solar panel mount flashing 6 are perpendicular to the plane of the sheet. Thus, only the edges are evident. The bottom right view illustrates the top solar panel mount flashing 6 wherein surface 6b is facing out to the page. Screw holes are visible by which the top solar panel mount flashing 6 can be fixed to the solar panel 5.

FIG. 3 illustrates several views of the lower solar panel mount bracket 7. The lower solar panel mount bracket 7 attaches to the solar panel 5 by surface 7b as illustrated in the upper right view of FIG. 3, while surface 7a of the lower solar panel mount bracket 7 is configured to be attached to the roof under a shingle below the solar panel 5. The upper left view of FIG. 3 is a top view of the surface 7a of the lower solar panel mount bracket 7. The surface 7a is configured to be attached to the roof of the structure to which the solar panel 5 is mounted by the screw hole which is evident. The lower left view of FIG. 3 is a side view of the lower solar panel mount bracket 7 with the edges of surface 7b surface 7a both coming out of the plane of the sheet. The lower right view of FIG. 3 shows the surface 7b of the lower solar panel mount bracket 7. The surface 7b is configured to be attached to the solar panel 5.

FIG. 4 is a top view of a roof having a peaked ridge. Solar panel 5 is mounted to the roof adjacent the ridge. In particular, the solar panel 5 is fixed to the roof by positioning the top solar panel mount flashing below shingles 11. A ridge cover 12 covers the ridge of the roof. The ridge cover 12 is elevated from the surface of the roof to form a space through which air can be vented from the interior of the structure to the exterior of the structure. Fan bracket 1 including the attached fans 2 is installed below the ridge cover 12. Thus, the fans 2 and the bracket 1 are not apparent in FIG. 4 because they are covered by the ridge cover 12. Likewise, the lower solar panel mount bracket 7 is not apparent because it is below the solar panel 5. Furthermore, the lower surface 7a of the lower solar panel mount bracket 7 is below a shingle below the solar panel 5. The lower surface 6a of the top solar panel mount flashing 6 likewise is mostly hidden from view in FIG. 4 because it is below one or more of the shingles 11.

Figure 5:
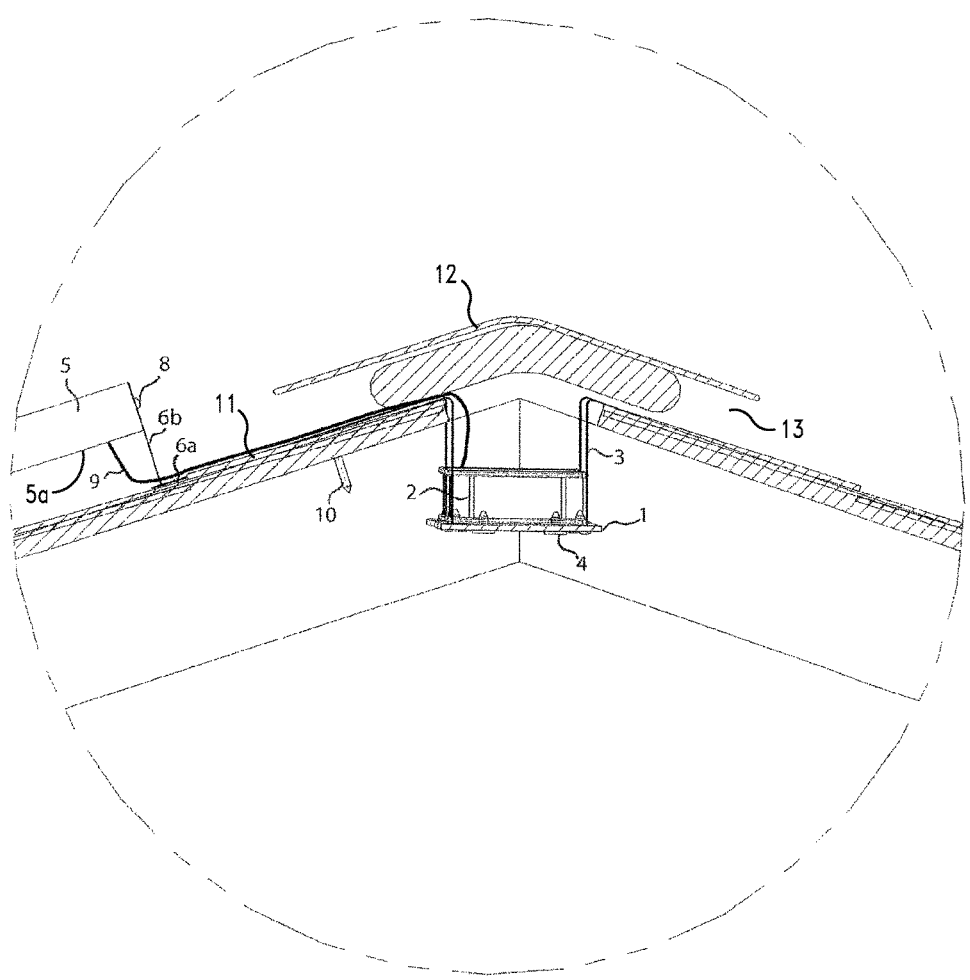
FIG. 5 is a cross section of a roof including a ridge vent and a solar panel according to one embodiment.

FIG. 5 is a cross section of the roof of FIG. 4 taken along cross-section lines A-A from FIG. 4. In FIG. 5, a solar powered ridge vent fan unit is installed on a roof having a ridge vent installed therein. A fan bracket 1 with fans 2 attached thereto is suspended by roof mount straps 3 from the roof (e.g. from the shingles, from a ridge beam, from rafters, or other suitable structure). An opening in the roof directly above the fan bracket 1 and fans 2 allows air from the interior of the structure to be passed to the exterior of the structure through the vent gaps 13 formed by the space between the shingles 11 and the ridge cover 12. The roof mount straps 3 are fixed to the fan bracket 1 by clips 4. The roof mount straps 3 can be flexible or semi-flexible or rigid. The solar panel 5 is mounted to the roof by a top solar panel mount flashing 6. The top solar panel mount flashing 6 includes a surface 6b attached by screw 8 to the solar panel 5 and surface 6a which is mounted to the roof by a screw 10 and is placed below the shingle 11. The lower solar panel mount bracket 7 is outside of the view of FIG. 5. In one embodiment the lower solar panel mount bracket 7 would be on the left side of the solar panel 5 with surface 7b mounted to the solar panel 5 and the surface 7a mounted to the roof below a shingle 11 below the solar panel 5. The top solar panel mount flashing 6 and the lower solar panel mount bracket 7 allow the solar panel 5 to be elevated from the roof, leaving a space between the roof and the solar panel 5 while still being rigidly fixed to the roof. This allows the area below the solar panel 5 to be well vented so that moisture and mold do not build up on the shingles 11 below the solar panel 5 and on the lower surface 5a of the solar panel 5. Also, heat from the roof and the shingles 11 will not be transferred to the solar panel 5 and disrupt the function of the solar panel 5.

A solar-powered ridge vent fan unit can be mounted to a roof that has a ridge vent installed therein in very little time and with very little effort. When installing the solar-powered ridge vent fan unit in a previously finished roof including a ridge vent, the solar-powered ridge vent fan unit may be installed by first removing shingles 11 from the areas of the roof on which the top solar panel mount flashing 6 and the lower solar panel mount bracket 7 will be attached. The surface 7a of the lower solar panel mount bracket 7 fixed to the roof by screwing a screw through a hole in the surface 7a.

The surface 6a of the top solar panel mount flashing 6 is then positioned the appropriate distance from the lower solar panel mount bracket 7 depending on the dimensions of the solar panel 5, and is attached to the roof by screwing screws 10 into the holes on the surface 6a of the top solar panel mount flashing 6. The top solar panel mount flashing 6 is positioned between the lower solar panel mount bracket 7 and the ridge of the roof. Next, the solar panel 5 is attached by screws to the surface 7b of the lower solar panel mount bracket 7 and to the surface 6b of the top solar panel mount flashing 6. In one embodiment, the top solar panel mount flashing 6 is already attached to the solar panel 5 when the kit is purchased. In other embodiments, the solar panel 5 is only attached to the top solar panel mount flashing 6 after purchase. The wire harness 9 is then run from the solar panel 5 through a gap 13 of the ridge vent and is positioned within the ridge vent area prior to installing the fan bracket 1 and fans 2. In one embodiment, the wire harness 9 is put through a hole in the shingles 11 and roof directly below the solar panel 5. The hole can be made prior to attaching the solar panel 5 to the roof. In this way, the wire harness 9 is not subjected to the elements and is not visible on the roof, but instead travels below the roof and connects to the fans 2 of the fan bracket 1. The fan bracket 1 with the fans 2 is attached by first removing the ridge cover 12 from over the ridge vent area. The roof mount straps 3 may be attached to the fan bracket 1 by the clips 4 prior to installing the fan bracket 1 and fans 2 in the ridge vent. The fan bracket 1 and fans 2 are then lowered into the ridge vent area while the ridge vent cover 12 is off, and the roof mount straps 3 are then attached to shingles 11 so that the fan bracket 1 and fans 2 are suspended in the ridge vent area. The wire harness 9 may then be attached to the fans 2. Alternatively, the wire harness 9 can be attached to the fans 2 prior to installing the fan bracket 1 and fans 2 into the ridge vent area. The ridge cover 12 is then replaced. The advantageous solar-powered ridge vent fan unit as described herein may be installed relatively easily in a very short amount of time and may require little or no maintenance for several years and even decades.

When sunlight is incident on the top surface of the solar panel 5, energy from the sunlight is converted to electricity, which is passed by the wire harness 9 to the fans 2 within the ridge vent. When the fans 2 receive the electricity from the solar panel 5, the fans 2 begin to rapidly rotate, for example at a speed of around 2700 rpm. As the fans begin to rotate, air is blown from the interior of the structure through the ridge vent and the ridge vent gap area 13. This helps to cool the interior of the structure, which can reduce the cost of cooling the interior of the structure. Such cooling is inexpensively done because the fans 2 are powered by energy from the sun rather than by energy from a local power grid. The fans 2 also serve to expel moisture from the interior of the structure to which they are attached. Such moisture can be extremely damaging to attics and other portions of the structure. The solar-powered fans 2 thus cool the building and expel moisture therefrom.

Some embodiments may include optional controls, a thermal switch, a thermostat, a computer that can operate and control the settings, a battery and backup system, one or more processors or controllers configured to control the fan and/or solar panel, etc.

While particular shapes and dimensions and configurations have been described in relation to FIGS. 1-5, other suitable dimensions, configurations, shapes and components can be used without departing from the scope of the present disclosure as will be apparent in light of the present disclosure. For example, more or fewer brackets, flashings, or straps can be used in according with principles of the present disclosure without departing from the scope of the present disclosure. All such other shapes, materials, components, and structures fall within the scope of the present disclosure.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A solar powered ridge vent fan kit comprising:
   a fan;
   a fan bracket configured to couple to the fan and to fit within a ridge vent of a roof;
   a solar panel;
   a top flashing having a first surface and a second surface, the first surface and the second surface being at a non-zero angle to each other, the first surface being configured to secure to a first side of the solar panel, and the second surface being configured to secure to the roof adjacent the ridge vent with the solar panel spaced above the roof, the top flashing having a length greater than a length of the first side of the solar panel with the first surface configured to prevent debris from gathering under the solar panel when the solar panel is secured to the roof, wherein the first side of the solar panel is perpendicular to the roof when the solar panel is secured to the roof; and
   a lower mount bracket configured to be fixed to a second side of the solar panel to support the solar panel parallel to the top flashing, wherein the top flashing is an upper support, the lower mount bracket having a surface configured to be mounted on the roof underneath the solar panel, wherein a length of the lower mount bracket is less than a length of the second side of the solar panel to provide for ventilation of an area under the solar panel when the solar panel is secured to the roof.

2. The solar powered roof vent fan kit of claim 1 wherein the second surface of the top flashing is configured to be mounted directly to the roof, with the second surface of the top flashing extending upward toward the ridge vent away from the solar panel.

3. The solar powered roof vent fan kit of claim 2 wherein the second surface of the top flashing is configured to be concealed below a shingle of the roof.

4. The solar powered roof vent fan kit of claim 1 wherein the second surface of the top flashing is configured to be concealed below a shingle of the roof.

5. The solar powered roof vent fan kit of claim 1 comprising a wire harness configured to couple between the fan and the solar panel to supply the fan with electrical power from the solar panel when the fan is installed in the ridge vent and the solar panel is fixed to the roof.

6. A method of installing a solar-powered ridge vent fan unit, comprising:
   positioning a fan within a ridge vent in a roof;
   fixing a first flashing to the roof adjacent the ridge vent, the first flashing having a first surface and a second surface, the first surface and the second surface being at a non-zero angle to each other with the second surface of the flashing secured to the roof adjacent the ridge vent;
   fixing a first side of a solar panel to the first surface of the first flashing, the first surface of the first flashing being configured to hold the solar panel above the roof and spaced apart from the roof with an open space between the solar panel and the roof and having a length greater than a length of the first side of the solar panel, the first surface being configured to prevent debris from gathering under the solar panel when the panel is secured to the roof, wherein the first side of the solar panel is perpendicular to the roof when the solar panel is secured to the roof;
   fixing a bracket to the roof;
   fixing the bracket to a second side of the solar panel to hold the solar panel above the roof and spaced apart from the roof, wherein the bracket has a length less than a length of the second side of the solar panel to facilitate ventilation of an area between the solar panel and the roof; and
   electrically coupling the solar panel to the fan to power the fan.

7. The method of claim 6 wherein positioning the fan in the ridge vent includes suspending the fan from the roof within the ridge vent by a strap coupled to the roof.

8. The method of claim 7 wherein the strap is flexible.

9. The method of claim 6 comprising concealing at least a portion of the second surface of the first flashing beneath shingles of the roof.

10. The method of claim 9 wherein the second surface of the first flashing extends away from the solar panel toward the ridge vent.

11. The method of claim 6 comprising positioning the bracket underneath the solar panel.

12. The method of claim 11 comprising positioning a portion of the bracket below a shingle of the roof.

13. A ridge vent fan kit comprising:
   a fan bracket;
   a fan mounted to the fan bracket;
   a strap configured to suspend the fan bracket in a ridge vent of a roof;
   a solar panel;
   a flashing having a first surface and a second surface, the first surface and the second surface being at a non-zero angle to each other, the first surface being configured to secure to a first side of the solar panel and the second surface being configured to secure to the roof adjacent the ridge vent with the solar panel spaced above and substantially parallel to the roof, the first surface of the flashing having a length greater than a length of the first side of the solar panel and configured to prevent debris from gathering under the solar panel when the solar panel is secured to the roof, wherein the first side of the solar panel is perpendicular to the roof when the solar panel is secured to the roof; and
   a solar panel mounting bracket configured to fix a second side of the solar panel to the roof with a space between the roof and the solar panel, the solar panel mounting bracket having a length less than a length of the second side of the solar panel to facilitate ventilation of the solar panel when the solar panel is mounted to the roof.

14. The ridge vent fan kit of claim 13 comprising a plurality of fans mounted to the fan bracket.

15. The ridge vent fan kit of claim 13 wherein the solar panel is configured to supply power to the fan.

16. The ridge vent fan kit of claim 13 comprising a wire harness configured to couple to the solar panel and to the fan.

* * * * *